3,425,545
METHOD AND APPARATUS FOR SEPARATING FIBROUS SUSPENSIONS
Rudolf Zemanek, 39 Kosicka; Jan Fellegi, 9 Holubyho; and Jan Janci, 8 Smolnicka, all of Bratislava, Czechoslovakia
Continuation of application Ser. No. 461,265, June 4, 1965, which is a continuation-in-part of application Ser. No. 359,043, Apr. 13, 1964. This application Oct. 23, 1967, Ser. No. 678,154
Claims priority, application Czechoslovakia, Aug. 2, 1963, 4,428/63; Feb. 4, 1965, 780/65; Feb. 18, 1965, 1,115/65
U.S. Cl. 209—2                                                          4 Claims
Int. Cl. B04c 3/00

ABSTRACT OF THE DISCLOSURE

A fibrous suspension including heavy and substantially spherical particles, fibrous impurities and fibrous accepts is subjected to vortical forces in a 3-product hydrocyclone whose length is at least seven times its maximum diameter. The fibrous impurities and the fibrous accepts, which are of substantially the same density, are discharged from the inner part of the inner vortex and from the outer part of the inner vortex, respectively, through concentric vortex finders. The particles are discharged from the apex outlet.

---

This application is a continuation of application Ser. No. 461,265, filed June 4, 1965 (now abandoned), which in turn is a continuation-in-part of application Ser. No. 359,043, filed Apr. 13, 1964 (now abandoned).

The present invention relates to a method and apparatus for separating impurities from paper pulp and similar fibrous suspensions, and more particularly to a method and apparatus for removing from such suspensions unacceptable fibrous material which differs from acceptable fibres in size and/or shape but not in density, as well as for removing fibrous and nonfibrous impurities having a specific weight which is different than that of acceptable fibres.

One of the most difficult tasks in papermaking is the separation of various types of impurities which are present in the pulp. Such impurities include remnants of bark, bast, uncooked parts of chips, knots, undefibrated parts of repulped material, and inorganic substances including soot, sand or the like. For example, it is essential that pulpwood should be thoroughly freed not only of the outer but also of the inner bark, which latter is usually called bast. This operation must be carried out by resorting to an expensive debarking process which brings about high losses in wood. In spite of such treatment, there still remain traces of bark and bast which, together with other impurities (particularly knots and/or uncooked parts of chips), affect the purity of the cellulose. Though differing in size and/or shape from good fibres which are suitable for papermaking, such impurities (as well as undefibrated repulped material) generally have the same specific weight as the acceptable fibres.

Heretofore, such impurities were removed by resorting to complex apparatus including different types of separators each of which is capable of separating only one or two but not all types of impurities. Presently known separating apparatus include hydrocyclones of the general type commonly used in predressing plants and in coal preparation. There are two principal types of hydrocyclones, namely, so-called two-product and three-product hydrocyclones.

A typical two-product hydrocyclone which is being used for the separation of impurities from cellulose is provided with a conical separating chamber and comprises a tangential supply pipe serving to admit the suspension at the larger-diameter end of the vessel. A reject nozzle is provided at the apex of the vessel to discharge separated impurities having a relatively high specific weight, and the hydrocyclone also comprises a discharge pipe for the purified substance which is connected to the larger-diameter end of the vessel. Such hydrocyclones are normally used for removal of spherical or heavy impurities or for separation of short and bulky fibre bundles, but the larger and/or longer fibre bundles, shives and flakes are normally removed by screening.

Three-product hydrocyclones are used for separation of specifically lighter particles or for separation of particles whose sedimentation proceeds at a slower rate. Such hydrocyclones are employed primarily in separation of ore or coal from suspensions wherein inorganic particles of similar shape but of different specific weight must be separated from useful material. The particles which must be separated from good material are lighter in weight or slower in sedimentation. As far as three product hydrocyclones have found use by the manufacturers of paper at all they have been provided with a separating chamber which is divided by a baffle into two parts and is capable of rejecting only those particles which are specifically heavier or specifically lighter than the acceptable fibres. The operating principle of all hydrocyclones which are presently used in treatment of pulp is the same, but their components are incapable of separating impurities from all types of suspensions and they can only separate certain types of impurities but not all foreign matter which must be sorted out.

Accordingly, it is an important object of the present invention to provide a novel method of separating from fibrous pulp suspensions all or nearly all types of impurities in a single operation and in a single apparatus or in a unitary apparatus.

Another object of the invention is to provide a novel and very simple separating apparatus which may be utilized to practice the above method and which can produce cellulose of exceptionally satisfactory purity.

A further object of the invention is to provide a method and apparatus for the production of cellulose from wood which contains remnants of inner bark and to construct the apparatus in such a way that, in the course of the separating operation, its components will also eliminate bast fibres so as to simplify the cleaning of wood prior to its conversion into cellulose.

A further object of the instant invention is to provide a method according to which selective separation and classification of fibre bundles is carried out in such a way that such material which is too large to be useful as such may be subjected to further treatment in order to defibrate it to an extent suitable for paper making and that useful fibres may be separated from spherical particles which constitute waste material in cellulose production.

A concomitant object of the invention is to provide an improved hydrocyclone which may be utilized in practicing the above outlined method and to construct the hydrocyclone in such a way that its components will automatically separate and classify all foreign matter which must be removed from a fibrous suspension.

Our invention is based on the discovery that, if a fibrous suspension is caused to flow at a certain velocity in a first helical path which is long enough to insure that the suspension must remain therein for a period of sufficient length, the hydraulic forces involved will cause large bundles of fibres, shives and flakes to accumulate in in a first zone which is nearer to the axis of the first helical path while the heavy reject material accumulates in a second zone which is more distant from the axis of this helical path and the acceptable fibres accumulate in a third zone which occupies the space between the first and second zones. Thus, and if the helical path in which the suspension flows is surrounded by the vessel of a hydrocyclone, the heaviest reject material will accumulate along the internal surface of the vessel so that it can be readily evacuated through a relatively small discharge opening or nozzle at one end of the vessel. The remaining impurities and the good fibres are entrained in a second helical path which is surrounded by the first helical path. While advancing in this second path, good fibres and the remaining impurities are separated from each other in such a way that acceptable material accumulates mainly in the outer part of the second helical path and the remaining impurities accumulate in its inner part surrounding an air core. Such remaining impurities may be separated from good fibres by means of concentric vortex finders the inner and smaller one of which removes the fibrous impurities together with air from the air core whereas the other vortex finder removes the remainder of the suspension which mainly contains good fibres.

In order to make sure that the just described separation of impurities will be carried out with requisite efficiency, the relationship between the dimensions of various components is important. Such dimensions will vary within certain limits, depending on the shape and diameter of the hydrocyclone vessel, i.e.. whether the separator comprises a conical, a partly conical and partly cylindrical, or a truly cylindrical vessel. The most important dimension is the length of the vessel, and such length must be at least seven times the maximum diameter of the vessel in order that the hydraulic forces involved will have sufficient time to bring about the desired separating action. Other dimensions are preferably within the following ranges: The inlet of the vessel should have an inlet cross-section area equivalent to a cylindrical inlet of a diameter of between 0.15 and 0.3W (wherein W is the maximum diameter of the vessel); the internal diameter of the outer vortex finder at its smallest opening should be between 0.19 and 0.35W; such minimum internal diameter of the inner vortex finder should be between 0.07 and 0.11W; and the diameter of the discharge opening for heavier impurities should be between 0.03 and 0.14W. For a truly conical vessel, the corresponding preferred ranges are respectively 0.19 to 0.26W; 0.19 to 0.26W; 0.07 to 0.11W; 0.04 to 0.07W; and the preferred axial length of the vessel is 8 to 10W.

The suspension preferably enters the separating chamber of a primary vessel at a pressure which exceeds the pressure at the outlet from the outer vortex finder by 2-4 atmospheres pressure. For a secondary vessel, the pressure at the inlet may be 0.4 to 0.8 atm. above the pressure at the outlet. The material issuing from the inner vortex finder is preferably maintained at a pressure which is 0.4 to 0.8 atm. below that at the outlet of the outer vortex finder. The differential between the pressures prevailing at the outlets of the vortex finders is preferably produced by a throttle valve or an equivalent flow restricting device which may be installed in the discharge pipe for good fibres. Alternatively, a secondary separator may be connected to the outlet of the outer vortex finder in the primary separator, and the necessary pressure differential is then produced by the pressure at the inlet of the secondary separator. In this way, a narrow air core is obtained and it is then possible to separate a very thin layer of suspension immediately surrounding the air core and moving at a high axial velocity. The foregoing steps will result in separation of large fibre bundles, shives and flakes of the type having a length-to-diameter or length-to-thickness ratio of 5:1 or more. The specific gravity of such impurities equals that of acceptable fibres and they are suited for further treatment and use in the production of paper.

The above features render the method of our invention suitable for the purification and separation of cellulose in a single operation as compared to the heretofore known methods of separating in hydrocyclones which are capable of eliminating either spherical particles only or particles differing by their specific weight from the purified fibres.

The separator embodying the present invention can operate either singly or in various combinations according to the percentage and nature of impurities in the fibrous suspension.

In carrying out the novel method it is possible to achieve an efficient separation of up to 95% of fibrous and 85% of spherical impurities. While the heavier impurities are separated with the help of centrifugal force, the separation of fibrous impurities is additionally made possible by the particular hydraulic conditions created in the apparatus of our invention.

The above outlined results are most surprising, particularly when one considers that the fibrous impurities which are removed through the inner vortex finder are mainly of the same or substantially the same density as the acceptable fibres. At this time, the exact reasons as to why certain impurities concentrate in the inner part and the good fibres accumulate in the outer part of the inner vortex are not yet known. The hydraulic forces which develop in the vortex include shear, velocity pressure and centrifugal force. In conjunction with those physical characteristics of fibrous impurities which are different from the characteristics of good fibres and spherical or heavy impurities, such hydraulic forces apparently act differently on fibrous impurities by pulling or driving them into the inner vortex, and more particularly into the inner part or zone of the inner vortex, whereas the acceptable fibres tend to accumulate in the outer part of this inner vortex.

The novel features which are considered as characteristic of the invention are set forth in particular in the appended claims. The improved separating apparatus itself, however, both as to its construction and its mode of operation, together with additional features and advantages thereof, will be best understood upon perusal of the following detailed description of certain specific embodiments with reference to the accompanying drawings, in which:

Figure 1:
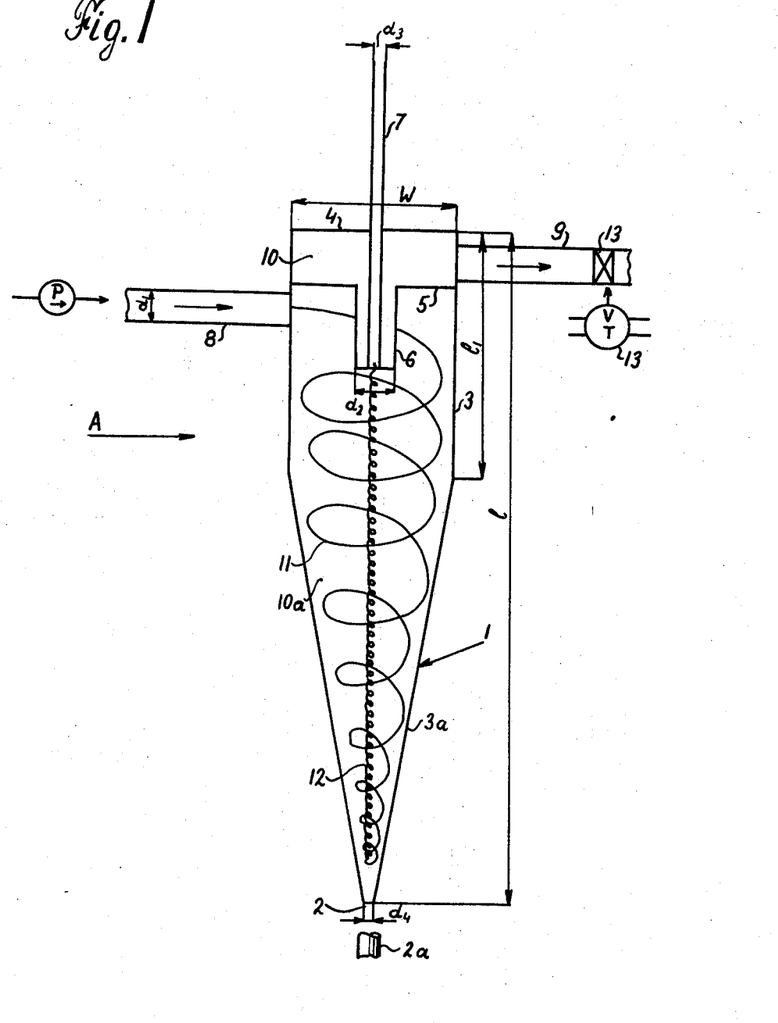
FIG. 1 is an axial section through a hydrocyclone which comprises a partly conical vessel.

Referring first to FIG. 1 there is shown a separator A in the form of a hydrocyclone comprising a vessel 1 having a conical lower part 3a which tapers downwardly toward a discharge opening or nozzle 2 (sometimes called apex nozzle). The nozzle 2 discharges into a suitable conduit 2a or into a receptacle (not shown) which serves to convey or to collect spherical and relatively heavy particles. The upper part 3 of the vessel 1 is of cylindrical shape and its upper end is closed by an end wall 4. This upper part 3 accommodates a transverse partition 5 having a central opening and supporting a downwardly extending tubular outer vortex finder 6. The vortex finder 6 is coaxial with a tubular inner vortex finder 7 which extends through the central opening of the partition 5 and upwardly through and beyond the top wall 4. A supply pipe 8 extends tangentially with reference to the periphery of the upper part 3 and serves to admit into the vessel a suspension which enters at a level below the partition 5. A discharge pipe 9 is connected to and extends tangentially from the upper part 3 at a level above the partition 5. The top wall 4 and the partition 5 define between themselves a collecting chamber 10 which receives material through the upper end of the outer vortex finder 6 and discharges such material into the intake end of the discharge pipe 9.

The operation of the separator A is as follows:

The suspension, usually in a concentration of 0.3 to 1 percent, is fed through the supply pipe 8 at an elevated pressure and flows tangentially of the upper part so that a whirling motion is produced in the lower or separating chamber 10a of the vessel 1. The suspension forms an outer vortex by flowing along a helical path 11 and advances downwardly toward the apex of the conical part 3a. Spherical particles and particles of higher specific weight are separated under the action of centrifugal force along this helical path 11 and approach the internal surface of the conical part 3a. Such particles slide along the internal surface of the conical part 3a and descend toward the discharge opening 2. In the proximity of this opening, the movement of the remainder of the suspension is reversed through an angle of 180 degrees so that the suspension forms an inner vortex by flowing along an inner helical path 12 of smaller diameter to return into the upper part 3. An air core is formed in the center of the inner helical path 12.

Large fibrous impurities are connected in a narrow cylindrical zone surrounding the air core, and such large impurities are withdrawn (together with air from the air core) through the inner vortex finder 7. As shown in FIG. 1, the axis of the helical path 12 coincides with the common axis of the vortex finders 6 and 7.

The discharge pipe 9 contains a throttle valve 13 which can be adjusted to create optimum hydraulic conditions so that the large fibrous impurities are transferred, with utmost efficiency, into the narrow zone surrounding the air core and are discharged therewith through the inner vortex finder 7.

A very important feature of the separator A is that it creates such conditions which will insure highly satisfactory separation of all undesirable impurities in a single operation. The separator also permits of selective separation and division of large fibrous impurities from spherical particles.

FIG. 1 shows that the lower ends of the vortex finders 6 and 7 are located in a common horizontal plane; however, this is not essential. FIG. 1 further indicates those dimensions the relationship of which should remain within the previously mentioned limits to insure that the hydrocyclone will separate the spherical particles because of their different specific weight and that the hydrocyclone will also separate bundles of fibres according to their shape and size. This is one of the main features of the present invention, and it is this feature which enables the improved hydrocyclone to be used for the aforedescribed separation of large fibrous impurities from fibrous suspensions. Up to the present time, such separation in a conventional cyclone was not possible because large fibres have the same specific weight as good fibres. This surprising result is achieved by proper selection of dimensions of the component parts which constitute the improved hydrocyclone, of the velocity of treated material, and of pressures as well as counterpressures which are generated on purpose, not by chance. The special characteristics of large fibrous impurities, i.e., their size and shape, are utilized in order to transfer them (in response to kinematic and flow conditions prevailing in the hydrocyclone) into the narrow zone surrounding the air core. At the same time, suspension in the narrow zone travels at a very high axial velocity which assists in the separation of undesirable particles and in their transfer into the inner vortex finder 7.

The dimensions which are particularly important for proper operation of the hydrocyclone A include the diameter $d_1$ of the supply pipe 8 (i.e., the diameter of the inlet for the suspension), the internal diameter $d_2$ of the outer vortex finder 6 which discharges good fibres, the internal diameter $d_3$ of the inner vortex finder 7, the diameter $d_4$ of the discharge opening 2, the length $l$ of the vessel 1, and the length $l_1$ of the cylindrical upper part 3. Good fibres which are present in the space between the narrow cylindrical zone surrounding the air core and the internal surface of the vessel 1 are removed through the outer vortex finder 6 and enter the collecting chamber 10 to be discharged through the tangentially arranged pipe 9 which delivers them to the next processing station, not shown.

By manipulating the throttle valve 13, the optimum counterpressure can be obtained in order to improve the transfer of fibrous impurities toward the center of the vessel 1. The inner vortex finder 7 and (if necessary) the outer vortex finder 6 may be adjusted in the axial direction of the upper part 3.

Fibrous impurities which are removed through the inner vortex finder 7 can be subjected to a refining treatment. Spherical and heavy particles which are withdrawn through the discharge opening 2 are drained away as waste or are further treated to recover any good fiber present.

Figure 2:
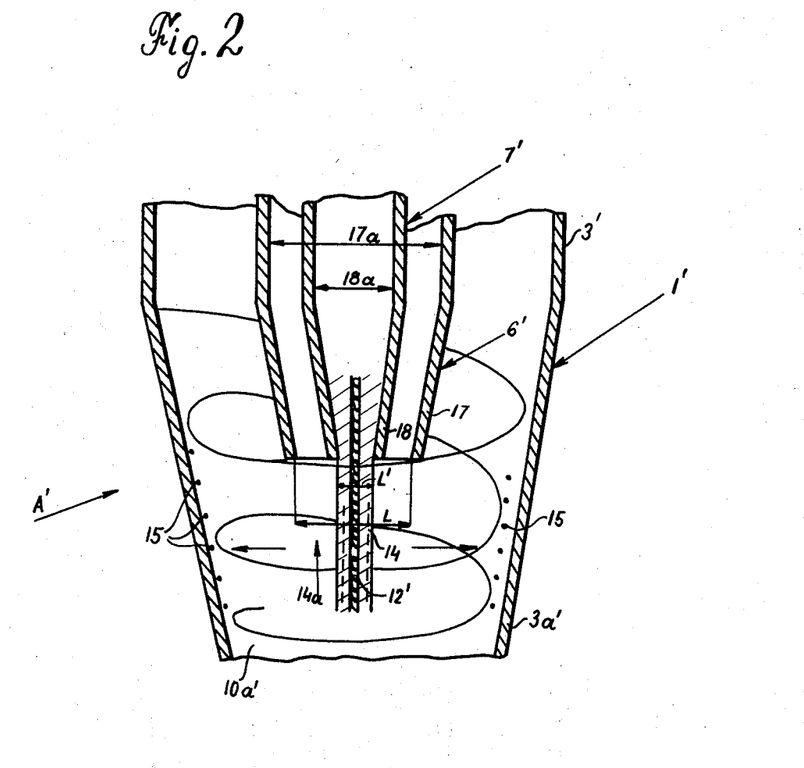
FIG. 2 shows, on a larger scale, a portion of a slightly modified hydrocyclone with partly conical vortex finders.

The conditions prevailing in the vessel 1' of a slightly modified hydrocyclone separator A' are shown in FIG. 2. The narrow cylindrical zone which contains large fibrous impurities is indicated at 14, and this zone surrounds the inner helical path 12'. The material in the zone 14 travels at a high axial speed and enters the lower end of the inner vortex finder 7' in the direction indicated by an arrow 14a. Spherical particles 15 are propelled by centrifugal force toward and slide downwardly along the internal surface of the conical lower part 3a'.

The lower end portions 17, 18 of the vortex finders 6' and 7' resemble hollow conical frusta which taper downwardly toward the discharge opening, not shown. The smallest diameter L' of the lower end portion 18 of the inner vortex finder 7' corresponds to the minimum diameter required for the discharge of large fibrous impurities from the separating chamber 10a' below the partition, now shown. The reference characters 17a, 18a respectively denote the maximum internal diameters of the vortex finders 6' and 7', and the character L denotes the minimum internal diameter of the outer vortex finder 6'. By lowering and by thereupon cutting off the lower end portion 18 of the inner vortex finder 7', the personnel in charge can select optimum operating conditions within the limits shown in the tables which will be described later, depending on the nature of impurities in the suspension and on the percentage of rejects.

Figure 3:
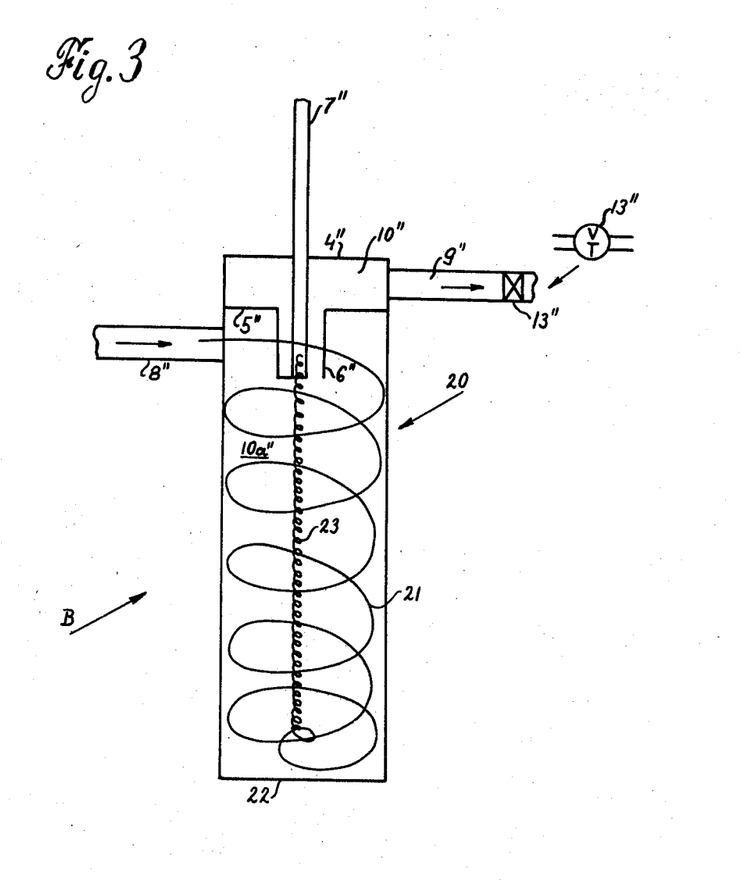
FIG. 3 is an axial section through a hydrocyclone which comprises a cylindrical vessel.

FIG. 3 illustrates a third hydrocyclone B comprising a cylindrical separating vessel 20 which is particularly suited for secondary cleaning of the suspension in order to remove at least some of the remaining fibrous impurities, i.e., the vessel 20 may be utilized to remove at least some of the large fibres which remain in the suspension passing through the pipe 9 or 9' of the hydrocyclone A or A'. The suspension is fed by a supply pipe 8" and enters tangentially through an inlet provided at the upper end of the vessel 20 to form a first vortex by flowing downwardly along an outer helical path 21 and toward a bottom wall 22. The wall 22 causes the suspension to reverse its direction by 180 degrees and to form an inner vortex by flowing in an inner helical path 23 toward the intake at the lower end of the inner vortex finder 7". A partition 5" which carries the outer vortex finder 6" is located between the discharge end of the supply pipe 8" and the outlet for good fibres. This outlet is connected with a discharge pipe 9" which contains a throttle valve 13". The top wall 4" of the vessel 20 defines with the partition 5" a collecting chamber 10", and the space between the partition and the bottom wall 22 constitutes a separating chamber 10a".

The operation of the hydrocyclone B is analogous to that of the hydrocyclone A or A'. The dimensions of its parts must be related to each other in a manner as outlined above in order to insure that the hydrocyclone B will bring about the desired separation of fibrous impurities. The narrow layer of suspension which surrounds the air core within the inner helical path 23 contains most of these impurities. This narrow layer, together with air from the air core, is withdrawn through the inner vortex finder 7", good fibres and the remaining liquid fraction of the suspension being evacuated through the outer vortex finder 6". It will be seen that the intakes of the vortex finders 6" and 7" are located in a common horizontal plane. The bottom wall 22 need not be provided with a discharge opening because the suspension entering at 8" is assembled to be sufficiently free of spherical and specifically heavy impurities.

Figure 4:
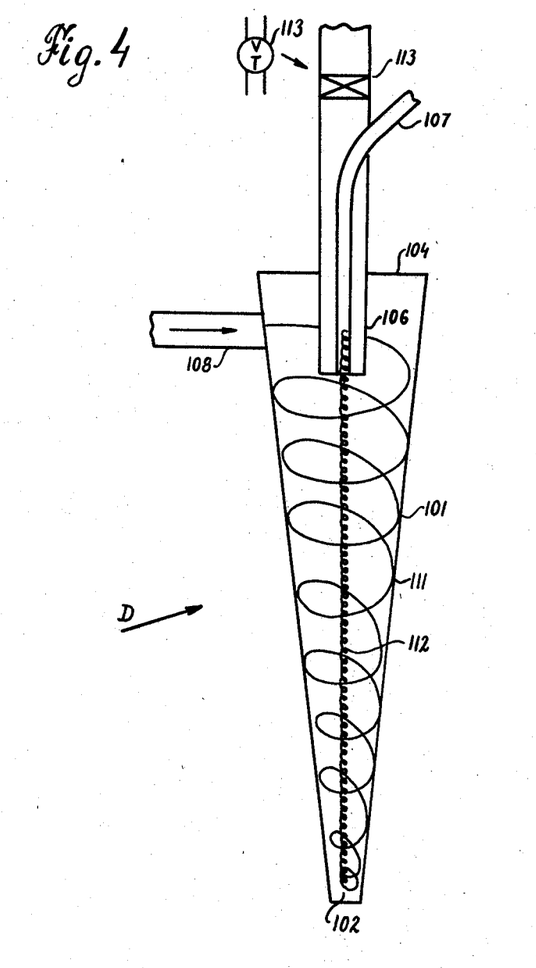
FIG. 4 is an axial section through a hydrocyclone which comprises a conical vessel.

A fourth hydrocyclone separator D is shown in FIG. 4. This separator includes an elongated conical vessel 101 which tapers all the way from the upper to the lower end thereof, and the lower end of the vessel is provided with a discharge opening or nozzle 102. A supply pipe 108 discharges tangentially into the upper part of the vessel 101 and the top of this vessel is closed by a wall 104. The outer vortex finder 106 which discharges good fibers is coaxial with the vessel 101 and contains a throttle valve 113, i.e., the outwardly extending part of the vortex finder 106 can be said to constitute a discharge pipe, but this discharge pipe extends axially (instead of tangentially) with reference to the vessel 101. The inner vortex finder 107 comprises a lower portion which is coaxial with the outer vortex finder 106 and an arcuate upper portion which extends through the wall of the outer vortex finder.

The operation of the separator D is similar to that of the separator A, A' or B. The suspension fed by the supply pipe 108 enters tangentially through the inlet at the upper end of the vessel 101 and forms a first vortex by flowing in an outer helical path 111. When it reaches the lower end of the vessel 101, the suspension reverses its direction and forms a second vortex by flowing in an inner helical path 112 which surrounds an air core. Fibrous impurities are concentrated in a narrow cylindrical zone which surrounds the air core and are withdrawn, together with air from the air core, through the inner vortex finder 107. Good fibres are discharged through the outer vortex finder 106, and the valve 113 may be adjusted to regulate the counterpressure so as to create optimum hydraulic conditions.

Figure 5:
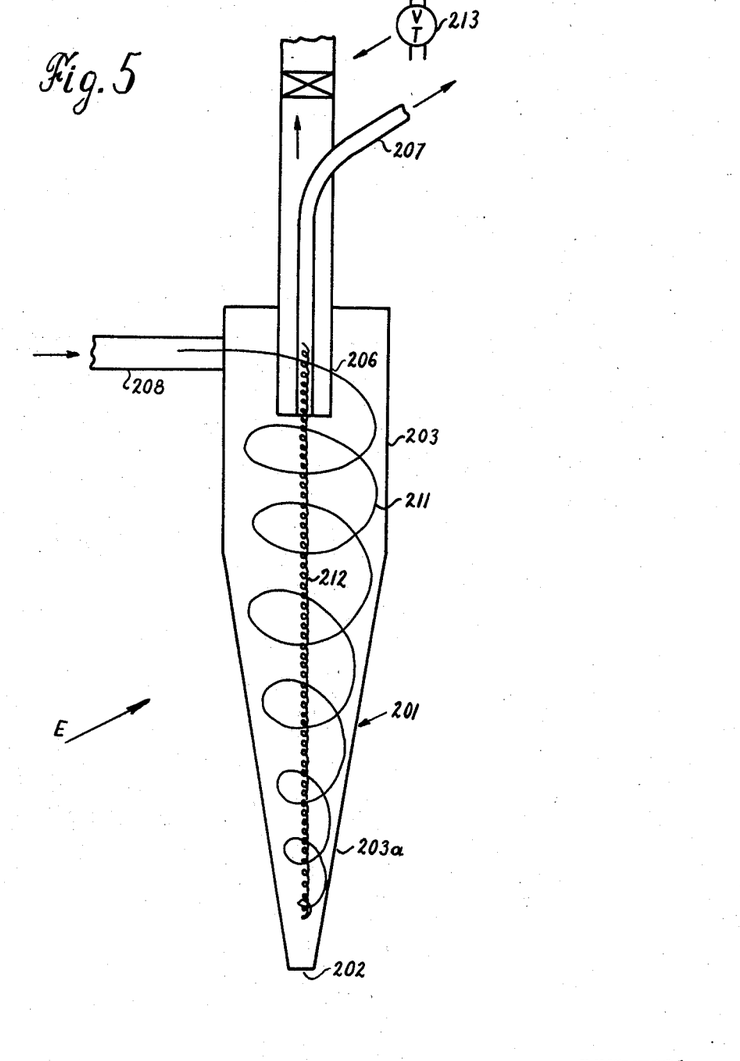
FIG. 5 is an axial section through a hydrocyclone with a partly cylindrical and partly conical vessel wherein the outer vortex finder is integral with the discharge pipe.

FIG. 5 shows a separator E which differentiates from the separator D in that its vessel 201 comprises a conical lower part 203a and a cylindrical upper part 203 whose inlet is connected with a tangential supply pipe 208. Good fibres and fibrous impurities are discharged through coaxial vortex finders 206 and 207. The upper portion of the inner vortex finder 207 extends through the wall of the outer vortex finder 206, and the latter is provided with a throttle valve 213. The reference numerals 211 and 212 respectively indicate the two helical paths in which the suspension flows toward and away from the discharge opening 202 at the lower end of the conical part 203a.

Figure 6:
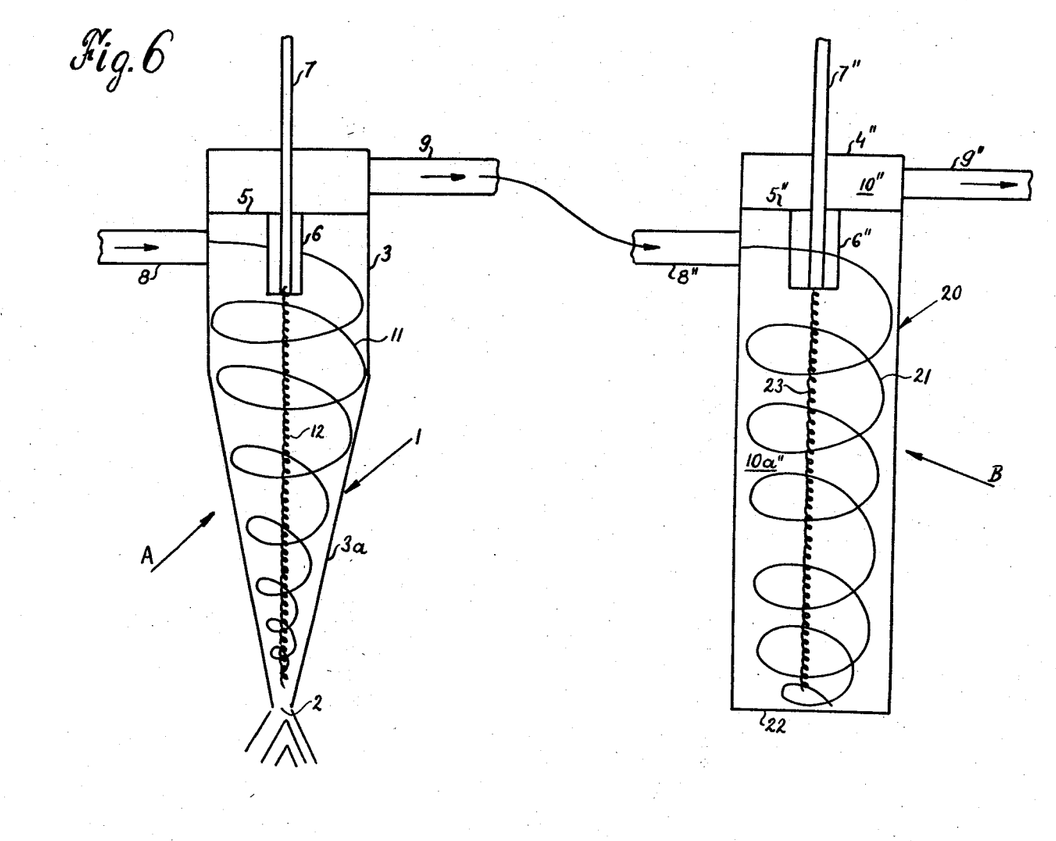
FIG. 6 shows a combination of a partly conical hydrocyclone vessel and a cylindrical hydrocyclone vessel connected in series.

FIG. 6 shows a two stage separator system which includes the separator A of FIG. 1 and the separator B of FIG. 3. The two separators are connected in series. As mentioned above, a certain counterpressure has to be produced in each separator in order to create the most favorable hydraulic conditions. In the partly conical separator vessel 1, the counterpressure exceeds by 0.4 to 0.8 atm. the pressure at the discharge end of the inner vortex finder 7. In FIG. 6, the throttle valve 13 has been omitted and the required counterpressure is produced by the cylindrical vessel 20 whose supply pipe 8" is connected to the discharge pipe 9 of the vessel 1. The input pressure at the inlet of the vessel 20 amounts to about 0.4 to 0.8 atm. gage pressure. An important advantage of the duplex separator shown in FIG. 6 is that the suspension issuing from the pipe 9 of the vessel 1 and flowing through the vessel 20 of the separator B is subjected to a secondary cleaning. Nearly all spherical and heavy impurities are separated in the vessel 1; therefore, no measures need be taken to separate them in the vessel 20 which, for this reason, is designed so as to separate only fibrous impurities.

Figure 7:
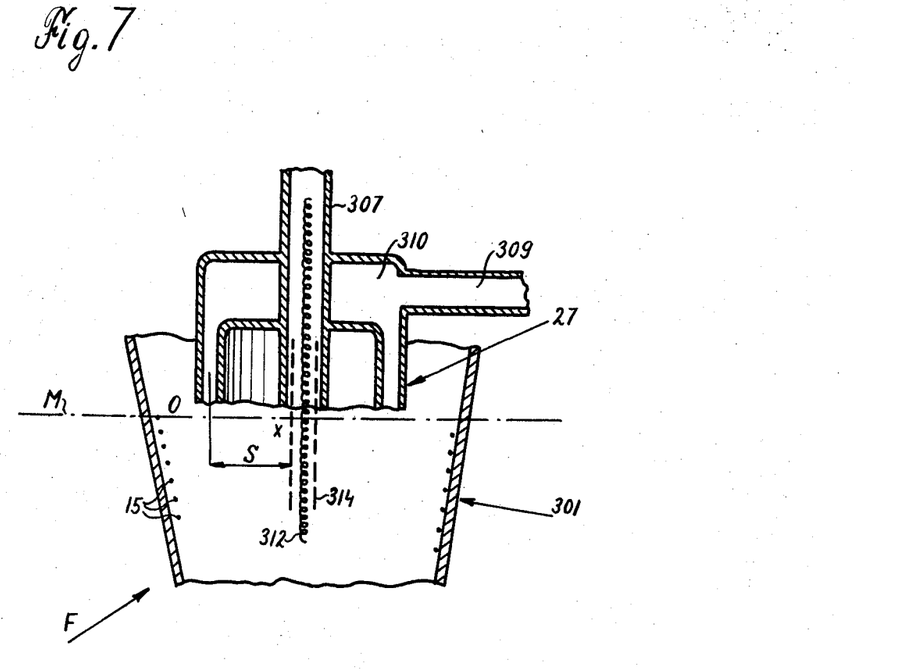
FIG. 7 shows, on a larger scale, a portion of a hydrocyclone with a modified outer vortex finder.

FIG. 7 illustrates a separator F which yields fibres having an exceptionally high degree of purity. Due to turbulence produced in the conical vessel 301, spherical particles 15 and other heavier impurities are hurled by centrifugal force toward the internal surface of the vessel. Large fibrous impurities are separated from the remainder of the suspension and accumulate in the narrow cylindrical zone 314 which surrounds the air core and is coaxial with the vessel 301.

Figure 8:
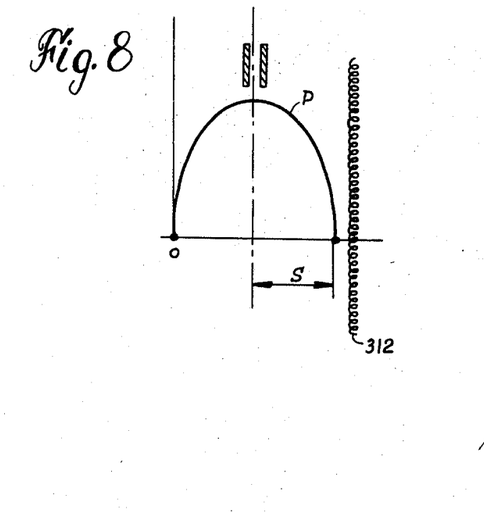
FIG. 8 is a diagram illustrating the distribution of good fibres in the top part of the hydrocyclone shown in FIG. 7.

The annular space which is located substantially midway between the zone 314 and the internal surface of the vessel 301 contains the cleanest part of the suspension, i.e., that part of the suspension which contains mainly good fibres. The changes in purity of the suspension, as seen in the horizontal plane M shown in FIG. 7, can be plotted as a curve P which is illustrated in FIG. 8. At the point O which is adjacent to the internal surface of the vessel 301, the purity is low because this is the zone where the spherical particles 15 accumulate. At the opposite end, i.e., adjacent to the point X shown in FIG. 7, the purity is also low because of the presence of fibrous impurities. Between these two points, the purity of the suspension varies substantially as indicated by the curve P, and it will be seen that, at a certain distance S from the point X, the purity of the suspension is at its highest.

As shown in FIG. 7, good fibres are withdrawn from the zone of maximum purity by flowing through the intake of an annular outer vortex finder 27. This vortex finder surrounds with clearance the inner vortex finder 307 and the intakes of the two vortex finders are concentric. The vortex finder 27 discharges into a collecting chamber 310 whose outlet is connected with the discharge pipe 309 containing a throttle valve, not shown. It will be seen that the position of the intake at the lower end of the outer vortex finder 27 corresponds to the crest of the curve P shown in FIG. 8 so that the suspension entering the collecting chamber 310 contains a minimum of undesirable ingredients.

*Example 1*

Pine wood sulphite cellulose was treated in a separator according to the present invention. The dimensions of the three separators were selected as follows: The maximum diameter W of the vessel was 150 mm., the diameter $d_1$ of the supply pipe was 30 mm., the diameter $d_2$ of the outer vortex finder was 30 mm., the internal diameter $d_3$ of the inner vortex finder was 12 mm., the diameter $d_4$ of the discharge opening was 6 mm., and the length $l$ of the vessel was 1,400 mm. The suspension contained spherical impurities including remnants of soot and bark, and fibrous impurities including uncooked parts of chips. The following table indicates the results of three tests.

TABLE 1

|  | Test number | | |
| --- | --- | --- | --- |
|  | 1 | 2 | 3 |
| Concentration of solids in the suspension at the inlet of the vessel (in percent) | 0.43 | 0.44 | 0.43 |
| Pressure at the inlet of the vessel (in atm. gage pressure) | 2.8 | 2.8 | 2.8 |
| Counterpressure at the outlet of the vessel (in atm. gage pressure) | 0.6 | 0.6 | 0.6 |
| Number of spherical particles in suspension prior to separation | 2,350 | 2,350 | 2,350 |
| Number of fibrous impurities in suspension prior to separation | 1,420 | 1,420 | 1,420 |
| Number of spherical particles in the suspension following separation | 558 | 549 | 551 |
| Number of fibrous impurities in suspension following separation | 231 | 233 | 232 |
| Efficiency as to separation of spherical particles (in percent) | 76.3 | 76.7 | 76.6 |
| Efficiency as to separation of fibrous impurities (in percent) | 83.8 | 83.6 | 83.7 |

The number of impurities prior to and after separation has been calculated for a surface of 1 m.² and a weight of 500 g./1 m.²/500 g.

*Example 2*

The same separator, with dimensions given in Example 1, was used in treatment of wood pulp which was conveyed through a conventional rotary-screen separator but, in spite of such treatment, still contained a high percentage of fibrous impurities.

TABLE 2

|  | Type of separator | | |
| --- | --- | --- | --- |
|  | A | D | E |
| Concentration of solids in the suspension at the inlet of the vessel (in percent) | 0.52 | 0.51 | 0.52 |
| Pressure at the inlet of the vessel (in atm. gage pressure) | 2.1 | 2.1 | 2.1 |
| Counterpressure at the outlet of the vessel (in atm. gage pressure) | 0.3 | 0.3 | 0.3 |
| Number of spherical particles in suspension prior to separation | 1,635 | 1,635 | 1,635 |
| Number of fibrous impurities in suspension prior to separation | 2,560 | 2,560 | 2,560 |
| Number of spherical particles in suspension following separation | 461 | 467 | 465 |
| Number of fibrous impurities in suspension following separation | 117 | 94 | 117 |
| Efficiency as to separation of spherical particles (in percent) | 72.01 | 71.4 | 71.5 |
| Efficiency as to separation of fibrous impurities (in percent) | 95.4 | 96.3 | 95.4 |

*Example 3*

The dual separator shown in FIG. 6 was used for treatment of pine wood cellulose containing remnants of bast fibres. The suspension contained a high percentage of fibrous impurities differing in color from good fibres.

In the first stage (separator A of FIG. 6), the suspension was treated at an elevated pressure, and the thus precleaned suspension was thereupon treated in the low-pressure separator B of FIG. 6 to remove fibrous impurities contained in the material issuing from the high-pressure separator A. The dimensions of the separator A were the same as those given in the Example 1. The length of the vessel 1 exceeded more than seven times the diameter of the upper part 3.

The separator B had the following dimensions: The diameter of the vessel 20 was 100 mm., the diameter of the supply pipe 8″ was 23 mm., the internal diameter of the outer vortex finder 6″ was 23 mm., the internal diameter of the inner vortex finder 7″ was 10 mm., and the length of the vessel 20 exceeded at least seven times the diameter of the wall 4″ or 22.

TABLE 3

|  | Separator A | Separator B |
| --- | --- | --- |
| Number of spherical particles in the suspension prior to separation | 2,532 | 653 |
| Number of fibrous impurities in suspension prior to separation | 18,420 | 2,136 |
| Number of spherical impurities following separation | 653 | 653 |
| Number of fibrous impurities following separation | 2,136 | 553 |
| Efficiency as to separation of spherical impurities (in percent) | 74.2 |  |
| Efficiency as to separation of fibrous impurities (in percent) | 88.4 | 74.1 |

Thus, the total number of impurities in the suspension issuing from the discharge pipe 9″ of the separator B shown in FIG. 6 was 1206 (per m.²/500 g).

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the following claims.

We claim:

1. A method of separating large fibrous impurities, substantially spherical particles and specifically heavy particles from a suspension which contains also acceptable fibres having about the same density as said fibrous impurities comprising the steps of conveying the suspension in a first helical path of a given maximum diameter through an axial distance which is at least seven times said maximum diameter and at such a pressure so that said particles are segregated by centrifugal force from the remainder of the suspension; withdrawing said segregated particles at the downstream end of said first path from the remainder of the suspension; conveying the remainder in a second helical path within said first path substantially through the same axial distance and at such a pressure that an air core develops within said second path and the large fibrous impurities form an inner annular layer surrounding said air core while the acceptable fibres form an outer annular layer about said inner annular layer; withdrawing the air core and said inner annular layer of large fibrous impurities at the downstream end of said second path; and separately withdrawing the rest of said suspension containing mainly acceptable fibres at the downstream end of said second path.

2. A method as defined in claim 1, and including the step of maintaining between the upstream end of said first path and the downstream end of said second path in the region of said outer annular layer a pressure difference of 2–4 atm.

3. A method as defined in claim 2, and including the step of maintaining at the downstream end of said second path the pressure in the region of said air core and said inner annular layer 0.4–0.8 atm. below the pressure at the region of said outer annular layer.

4. An apparatus for separating large fibrous impurities, substantially spherical particles and specifically heavy particles from a suspension which contains also acceptable fibres having the same density as said fibrous impurities, comprising, in combination, a first hydrocyclone separator including an upright elongated vessel of substantially circular cross section having at least a lower portion of conical shape tapering toward the lower end of said vessel; an inlet for the suspension to be separated into its components adjacent the other end of said vessel arranged to feed this suspension under pressure tangentially along its wall so that the suspension flows spirally in an outer vortex about the axis of said vessel toward the lower end of the latter; a discharge opening for said particles at said lower end of said vessel and having a cross section considerably smaller than that of said inlet; means for discharging suspension from said vessel adjacent its inlet so that the suspension flow reverses at said lower end and returns toward said upper end as an inner vortex surrounding a central air core, said means including inner and outer concentric vortex finders having their inlet ends substantially coaxial with said vessel, said vessel having a length of at least seven times its maximum diameter so that the suspension in the outer vortex is subjected to centrifugal force for sufficient time to cause the particles to concentrate mainly adjacent the vessel wall and to flow out of said discharge opening at said lower end of said vessel and so that the suspension in said inner vortex is subjected to the action of hydraulic forces for sufficient time to cause said fibrous impurities to concentrate mainly in the inner part of the inner vortex prior to reaching said vortex finders, the inlet end of the inner vortex finder having a diameter greater than that of said air core and smaller than that of the inlet end of said outer vortex finder so that the inner vortex finder receives and discharges only the air core and the inner fraction of said inner vortex containing most of said large fibrous impurities and the outer vortex finder receives and discharges only the outer fraction of said inner vortex containing most of the acceptable fibres; and a second hydrocyclone separator including a substantially upright substantially cylindrical second vessel having a closed bottom and an inlet and an outlet at the upper end thereof, said last-named inlet being connected with said outer vortex finder of said discharge means of said first-named vessel and discharging substantially tangentially into said second vessel so that the suspension entering said second vessel flows in an outer helical path toward and reverses its direction at the lower end of said second vessel to flow in an inner helical path which is coaxial with said second vessel, said second separator further comprising inner and outer vortex finders having intakes positioned to respectively receive the air core with the remainder of large fibrous impurities and the remainder of the suspension with acceptable fibres therein, said second vessel having an axial length at least equal to seven times the inner diameter of said second vessel.

References Cited

UNITED STATES PATENTS

| | | |
|---|---|---|
| 2,098,608 | 11/1937 | Berges. |
| 2,377,524 | 6/1945 | Samson. |
| 2,717,695 | 9/1955 | Martin ____________ 209—211 |
| 2,724,503 | 11/1955 | Fontein. |
| 2,756,878 | 7/1956 | Herkenhoff. |

FRANK W. LUTTER, *Primary Examiner.*

U.S. Cl. X.R.

209—211